United States Patent
Harwood et al.

(10) Patent No.: US 11,461,211 B1
(45) Date of Patent: Oct. 4, 2022

(54) METHOD AND SYSTEM FOR PROVISIONING WORKFLOWS WITH DATA MANAGEMENT SERVICES

(71) Applicant: EMC IP Holding Company LLC, Hopkinton, MA (US)

(72) Inventors: John S. Harwood, Boston, MA (US); Robert Anthony Lincourt, Jr., Franklin, MA (US); William Jeffery White, Plano, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/236,744

(22) Filed: Apr. 21, 2021

(51) Int. Cl.
| | |
|---|---|
| *G06F 11/34* | (2006.01) |
| *G06F 16/25* | (2019.01) |
| *G06F 16/901* | (2019.01) |
| *G06F 9/50* | (2006.01) |
| *G06F 3/04847* | (2022.01) |
| *G06F 3/0482* | (2013.01) |
| *G06Q 10/06* | (2012.01) |

(52) U.S. Cl.
CPC ........ *G06F 11/3414* (2013.01); *G06F 3/0482* (2013.01); *G06F 3/04847* (2013.01); *G06F 9/505* (2013.01); *G06F 16/256* (2019.01); *G06F 16/9024* (2019.01); *G06Q 10/06313* (2013.01); *G06Q 10/06315* (2013.01)

(58) Field of Classification Search
CPC .............. G06F 11/3414; G06F 3/0482; G06F 3/04847; G06Q 10/06315; G06Q 10/06313
See application file for complete search history.

(56) References Cited

U.S. PATENT DOCUMENTS

| | | |
|---|---|---|
| 9,356,883 B1 | 5/2016 | Borthakur |
| 10,996,658 B1 | 5/2021 | Potts et al. |
| 2003/0149685 A1 | 8/2003 | Trossman et al. |
| 2011/0138147 A1 | 6/2011 | Knowles et al. |
| 2011/0145318 A1 | 6/2011 | Krishnamurthy et al. |
| 2014/0223427 A1 | 8/2014 | Bootland et al. |
| 2016/0075436 A1* | 3/2016 | Rossano ............ G06F 3/04847 715/771 |

(Continued)

*Primary Examiner* — Barbara B Anyan
(74) *Attorney, Agent, or Firm* — Chamberlain, Hrdlicka, White, Williams & Aughtry (57) ABSTRACT

Techniques described herein relate to a method for deploying workflows with data management services. The method may include receiving, at a service controller of a federated controller, a request to deploy a workflow in a device ecosystem; decomposing the workflow into a plurality of workflow portions; assigning, based on identifying a first platform controller, a first workflow portion to the first platform controller; assigning, based on identifying a second platform controller, a second workflow portion to the second platform controller; assigning, based on the plurality of workflow portions and a capabilities and constraints data construct, data management services to the first platform controller and the second platform controller; and initiating performance of the first workflow portion by the first platform controller and the second workflow portion by the second platform controller, in which performing the first workflow portion and the second workflow portion includes performing the data management services.

20 Claims, 5 Drawing Sheets

(56) References Cited

U.S. PATENT DOCUMENTS

| | | |
|---|---|---|
| 2016/0162478 A1* | 6/2016 | Blassin .......... G06Q 10/063112 |
| | | 706/12 |
| 2016/0300178 A1* | 10/2016 | Perry ..................... G16H 40/20 |
| 2016/0357241 A1 | 12/2016 | Ramadoss et al. |
| 2017/0048318 A1 | 2/2017 | Hebert et al. |
| 2017/0078392 A1 | 3/2017 | Gray et al. |
| 2017/0346683 A1 | 11/2017 | Li |
| 2018/0255329 A1* | 9/2018 | Gonzalez-Banos ..... G06F 16/70 |
| 2018/0276044 A1 | 9/2018 | Fong et al. |
| 2019/0052549 A1 | 2/2019 | Duggal et al. |
| 2019/0197654 A1 | 6/2019 | Hoppert et al. |
| 2019/0250996 A1 | 8/2019 | Shiihara |
| 2019/0354331 A1* | 11/2019 | Neugarten ............. G06F 3/0482 |
| 2019/0354402 A1 | 11/2019 | Bivens et al. |
| 2020/0241928 A1 | 7/2020 | Senevirathne et al. |
| 2020/0401491 A1 | 12/2020 | Mohamed et al. |
| 2021/0056509 A1* | 2/2021 | Lindy ..................... G06Q 40/12 |
| 2021/0064405 A1 | 3/2021 | Ashkar et al. |
| 2021/0133622 A1* | 5/2021 | Nidd ................... G06F 11/3072 |
| 2021/0314379 A1 | 10/2021 | Sodagar |
| 2022/0058556 A1* | 2/2022 | Warake ............ G05B 19/41845 |
| 2022/0067851 A1* | 3/2022 | Sinha ..................... G05B 15/02 |
| 2022/0150307 A1 | 5/2022 | Walsh et al. |

* cited by examiner

METHOD AND SYSTEM FOR PROVISIONING WORKFLOWS WITH DATA MANAGEMENT SERVICES

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy workflows, and how to efficiently do so once an execution environment is determined.

SUMMARY

In general, certain embodiments described herein relate to a method for deploying workflows. The method may include receiving, at a service controller of a federated controller, a request to deploy a workflow in a device ecosystem; decomposing the workflow into a plurality of workflow portions; assigning, based on identifying a first platform controller, a first workflow portion to the first platform controller; assigning, based on identifying a second platform controller, a second workflow portion to the second platform controller; assigning, based on the plurality of workflow portions and a capabilities and constraints data construct, data management services to the first platform controller and the second platform controller; and initiating performance of the first workflow portion by the first platform controller and the second workflow portion by the second platform controller, in which performing the first workflow portion and the second workflow portion includes performing the data management services.

In general, certain embodiments described herein relate to a non-transitory computer readable medium that includes computer readable program code, which when executed by a computer processor enables the computer processor to perform a method for deploying workflows. The method may include receiving, at a service controller of a federated controller, a request to deploy a workflow in a device ecosystem; decomposing the workflow into a plurality of workflow portions; assigning, based on identifying a first platform controller, a first workflow portion to the first platform controller; assigning, based on identifying a second platform controller, a second workflow portion to the second platform controller; assigning, based on the plurality of workflow portions and a capabilities and constraints data construct, data management services to the first platform controller and the second platform controller; and initiating performance of the first workflow portion by the first platform controller and the second workflow portion by the second platform controller, in which performing the first workflow portion and the second workflow portion includes performing the data management services.

In general, certain embodiments described herein relate to a system for deploying workflows. The system may include a federated controller for a device ecosystem, the federated controller including a plurality of service controllers. The system may also include a service controller of the federated controller, comprising a processor and memory, and configured to receive, a request to deploy a workflow in a device ecosystem; decompose the workflow into a plurality of workflow portions; assign, based on identifying a first platform controller, a first workflow portion to the first platform controller; assign, based on identifying a second platform controller, a second workflow portion to the second platform controller; assign, based on the plurality of workflow portions and a capabilities and constraints data construct, data management services to the first platform controller and the second platform controller; and initiate performance of the first workflow portion by the first platform controller and the second workflow portion by the second platform controller, in which performing the first workflow portion and the second workflow portion includes performing the data management services.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, that include data management services.

In one or more embodiments, as device ecosystems grow in size and complexity (e.g., from cloud to core to edge to client), connecting more diverse devices generating more data, the need to be able to inventory and characterize the connectivity is required in order to support complex workflows. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objectives (SLOs) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where one or more portions of a given workflow should be deployed.

Such a graph or database may include ecosystem information in various levels of abstraction. For example, each portion of an ecosystem (e.g., client, far edge, near edge, core, cloud, etc.) may have one or more service controllers. In one or more embodiments, the services controllers operate collectively as a federated controller for the ecosystem. Additionally, in one or more embodiments, each domain within a given portion of an ecosystem may have a platform controller.

In one or more embodiments, the service controllers receive, from platform controllers in their ecosystem portion, capabilities and capacity information, and also receive the same from other service controllers in the federated controller for their respective one or more platform controllers. Such capability and capacity information shared among the service controllers of the federated controller, along with information related to connectivity between different portions of the ecosystem, may be one level of the graph/database of the ecosystem.

In one or more embodiments, each platform controller in an ecosystem obtains and stores more detailed information of the device set of the domain with which it is associated, including, but not limited to, details related to topology, connection bandwidth, processors, memory, storage, data stored in storage, network configuration, domain accelerators (e.g., graphics processing units (GPUs)), deployed operating systems, programs and applications, etc. In one or more embodiments, the more detailed information kept by the various platform controllers represents a different layer of the graph or database of the ecosystem. Thus, in one or more embodiments, the service controllers of the federated controller of an ecosystem have a map of the capabilities and capacity of the various portions of the ecosystem, while the underlying platform controllers have a more detailed map of the actual resources within a given domain device set with which they are associated.

In one or more embodiments, any service controller of the federated controller of an ecosystem may receive a request to execute a workflow (e.g., from a console accessing the service controller). In one or more embodiments, the workflow may be received as, or transformed into, a directed acyclic graph (DAG). For example, a workflow may be received as a YAML Ain't Markup Language (YAML) file that is a manifest representing a set of interconnected services. In one or more embodiments, the service controller decomposes the DAG into workflow portions, such as services required, data needed, etc. In one or more embodiments, one or more such workflow portions may be identified as an anchor point. In one or more embodiments, the service controller then queries the graph (e.g., by performing a depth first or breadth first search) or database (e.g., using database query techniques) representing the ecosystem to determine what portion of the ecosystem is appropriate for the one or more anchor points (e.g., where the necessary data is or is generated from, where the infrastructure exists to execute a given service, etc.).

In one or more embodiments, once the anchor point has been identified, the service controller may then map it to the appropriate ecosystem portion, and map the other services of the workflow to portions of the ecosystem relative to the anchor point based on locality between the portions of the ecosystem and the anchor point, thereby minimizing the cost of data transfer as much as is possible. In one or more embodiments, the various workflow portions are then assigned to platform controllers of the domains to which the workflow portions were mapped, along with any related constraints derived from the workflow or SLO of the workflow.

In one or more embodiments, upon assigning workflow portions to platform controllers, the service controller identifies a portion of the platform controllers that requires data management services. The service identifies platform controllers that require data transformation services based on the workflow assigned to the platform controllers, connected workflows assigned to other platform controllers, and capability and capacity information associated with platform controllers. In one or more embodiments, the capabilities and capacity information further specifies whether domains associated with platform controllers are able to perform not only portions of workflow, but also data management services. Accordingly, in one or more embodiments, the services controller assigns data management services to the platform controllers that require the data management services based on the capability and capacity information associated with each platform controller that requires data management services. In one or more embodiments, the service controller provides the assigned workflow portions and the assigned data management services to the platform controllers.

In one or more embodiments, upon receiving the workflow portions and data management services, the platform controller provisions devices within the domains associated with the platform controller to perform the workflow and the data management services. In one or more embodiments, upon provisioning the devices within the domains associated with the platform controllers to perform the workflow portions and the data management services, the domains execute the workflow portions and the data management services. In one or more embodiments, the execution of the data management services facilitates the transmission of data between domains in order to reduce computational burden and time requirements to transmit data between domains and to reduce the likelihood of failures in performing workflow portions and failures to meet SLOs during the performance of the workflows.

Figure 1:
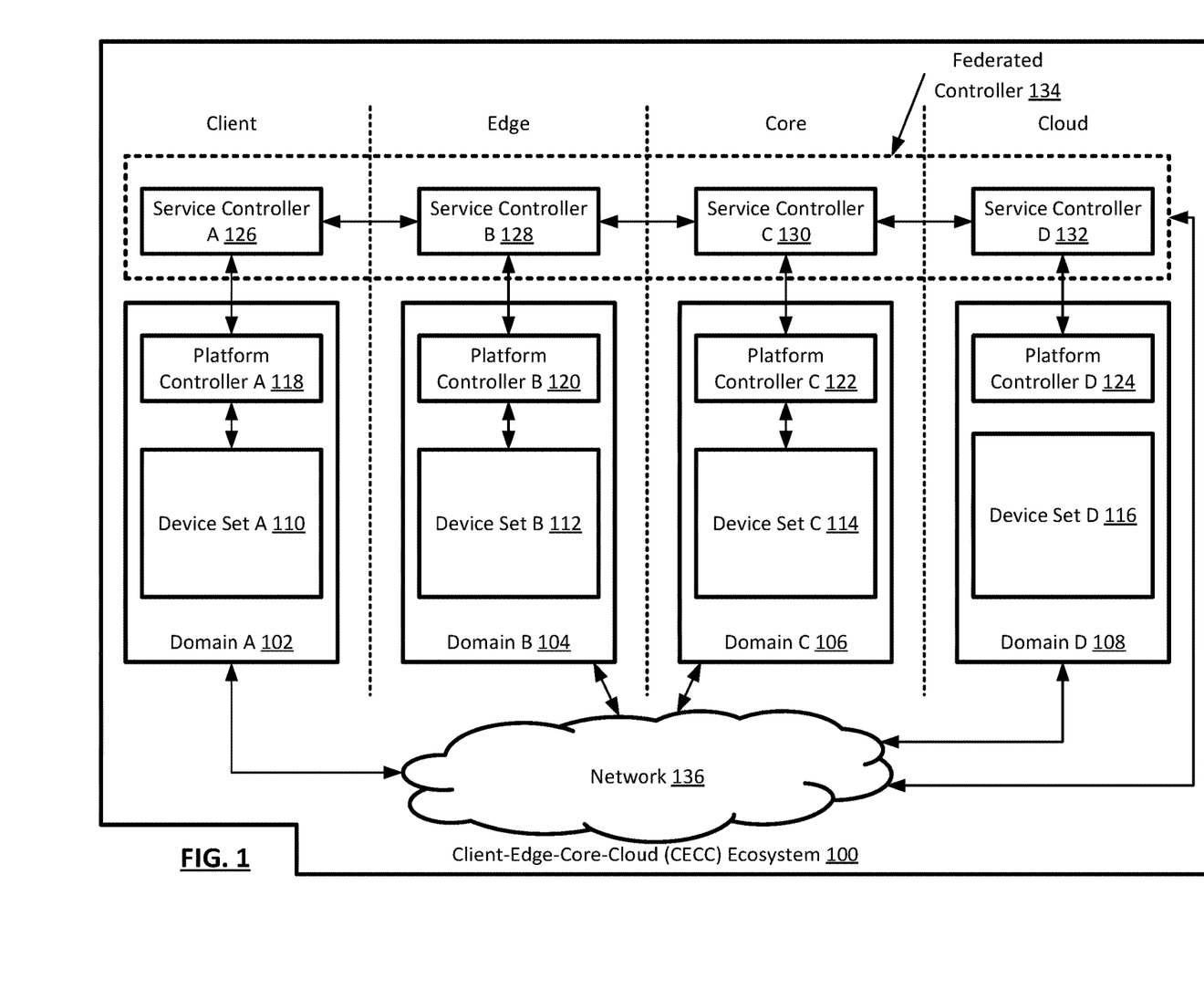
FIG. 1 shows a diagram of a system in accordance with one or more embodiments of the invention.

FIG. 1 shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include platform controller A (118) and device set A (110). Domain B (104) may include platform controller B (120) and device set B (112). Domain C (106) may include platform controller C (122) and device set C (114). Domain D (108) may include platform controller D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (126), service controller B (128), service controller C (130), and service controller D (132) may collectively be a federated controller (134). All or any portion of any device or set of devices in CECC ecosystem (100) may be operatively connected to any other device or set of devices via network (136). Each of these components is described below.

In one or more embodiments, CECC ecosystem (100) may be considered a hierarchy of ecosystem portions. In the example embodiment shown in FIG. 1, CECC ecosystem (100) includes a client portion, an edge portion, a core portion, and a cloud portion. However, CECC ecosystem (100) is not limited to the exemplary arrangement shown in FIG. 1. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or less layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of the CECC ecosystem (100) other than the example hierarchy shown in FIG. 1.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110). In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set A (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, the network (136) may include any number of devices within any device set (e.g., 110, 112, 114, 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, service controllers and/or platform controllers (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

In one or more embodiments, domain A (102) also includes platform controller A (118). In one or more embodiments, platform controller A (112) is any computing device (described above), or any portion of any computing device. In one or more embodiments, platform controller A (118) executes as a service. In one or more embodiments, platform controller A (118) includes functionality to discover details of device set A (110). Such details include, but are not limited to: how devices are connected; physical location of devices; network distance between devices within domain A (102) and network distance between devices with domain A (102) and devices in other domains (e.g., 104, 106, 108); what resources a device has (e.g., processors, memory, storage, networking, accelerators, etc.), how much capacity of a device or set of devices are used; what operating systems are executing on devices; how many virtual machines or other virtual computing instances exist; what data exists and where it is located; and/or any other information about devices in device set A (110).

In one or more embodiments, based on the information discovered by platform controller A (118) about device set A (110), platform controller A determines what capabilities device set A (110), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, data management services, etc. Data management services may include, for example, preprocessing data to generate events and metadata, transmitting data between domains in one or more different ways based on network connections, optimizing network connections to improve the transmission of data between domains, prioritizing data obtained from other domains based on obtained events and metadata, and/or any other data management services regarding the transmission of data between domains. Embodiments described herein are not limited to the aforementioned examples. In one or more embodiments, platform controller B (120), platform controller C (122), and platform controller D (124) are also computing devices (described above), and perform functionality similar to that of platform controller A (118) for their respective domains (i.e., domain B (104), domain C (106), and domain D (108)).

In one or more embodiments, data management services include processing data to optimize the flow or transmission of data between platform controllers (e.g 118, 120, 122, 124), domains (e.g., 102, 104, 106, 108), and/or device sets (e.g., 110, 112, 114, 116). In one or more embodiments, data management services include, but may not be limited to, compression, encryption, deduplication, movement and placement of data, interrogation and classification of data, characterizing data, identifying portions of data, referencing data, management of metadata, and/or any other services performed to optimize the flow of data between platform controllers (e.g, 118, 120, 122, 124), domains (e.g., 102, 104, 106, 108), and/or device sets (e.g., 110, 112, 114, 116) without departing from the departing from the scope of embodiments described herein.

In one or more embodiments, each domain (e.g., 102, 104, 106, 108) in CECC ecosystem (100) includes a device set (e.g., 110, 112, 114, 116) and a platform controller (e.g., 118, 120, 122, 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that include servers with more compute ability than devices in the client portion. Similarly, the core portion of CECC ecosystem (100) may include more powerful (e.g., having more compute resources) devices, a greater quantity of more powerful devices, specific architectures of sets of devices for performing certain tasks, etc. Also similarly, the cloud portion of CECC ecosystem (100) may include still more and different devices configured and deployed in different ways that the other portions of CECC ecosystem (100).

Additionally, although not shown in FIG. 1, the CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the platform controller for the domain (102, 104, 106, 108).

In one or more embodiments, each platform controller (118, 120, 122, 124) is operatively connected to a respective service controller (126, 128, 130, 132). In one or more embodiments, the service controllers (126, 128, 130, 132) are implemented as computing devices, where the computing devices may be embodiments of the computing devices discussed above. Any portion of CECC ecosystem (100) may include any number of service controllers (126, 128, 130, 132), each of which may be operatively connected to any number of platform controllers (118, 120, 122, 124) in any number of domains (102, 104, 106, 108) in a given ecosystem portion (e.g., client, edge, cloud, core). In one or more embodiments, each service controller (126, 128, 130, 132) is also operatively connected to the other service controllers (126, 128, 130, 132) in CECC ecosystem (100). In one or more embodiments, the operatively connected service controllers (126, 128, 130, 132) of CECC ecosystem (100) form federated controller (134) for CECC ecosystem (100). In one or more embodiments, federated controller (134) functions as a distributed service for deploying workflows within CECC ecosystem (100). In one or more embodiments, any service controller of federated controller (134) may be accessed to request provisioning of a workflow. In one or more embodiments, each service controller (126, 128, 130, 132) receives, from operatively connected platform controllers within the same portion of CECC (100), information about what capabilities underlying device sets of a domain can perform (including performance of data management services), how much capacity is available on the device set within a given domain (which may be updated on any update schedule), geographical distances between devices, network distances between devices, and/or any other information or metadata that may be useful to determine whether a portion of a workflow should be or can be provisioned within a given domain. In one or more embodiments, each service controller of federated controller (134) also shares the information with each other service controller of federated controller (134). Collectively, the shared information may be organized as a graph, or database, or any other data construct capable of storing such information and being queried to find such information. Such a graph or database may be a distributed data construct shared between the collection of service controllers of federated controller (134).

While FIG. 1 shows a configuration of components, other configurations may be used without departing from the scope of embodiments described herein. Accordingly, embodiments disclosed herein should not be limited to the configuration of components shown in FIG. 1.

Figure 2A:
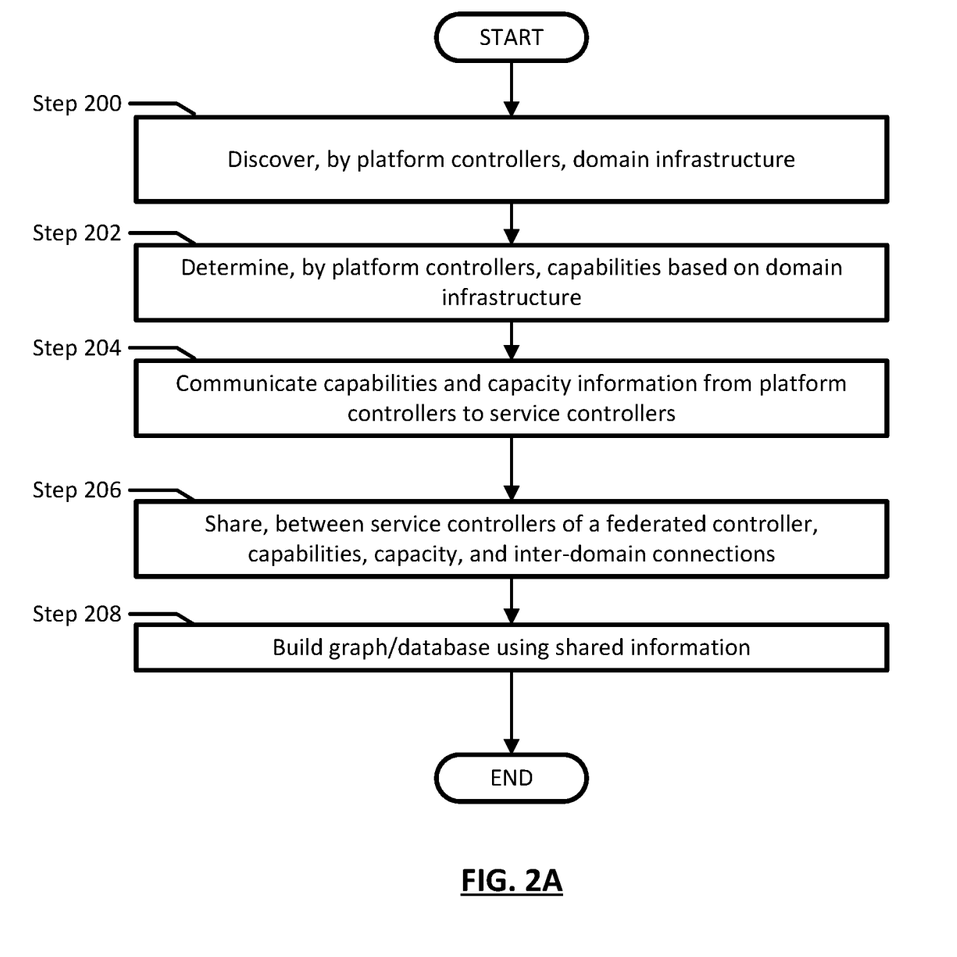
FIG. 2A shows a flowchart in accordance with one or more embodiments of the invention.

FIG. 2A shows a flowchart describing a method for discovering and obtaining information about an ecosystem of devices to be stored in a data construct for future queries when provisioning workflows in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, each platform controller in a given ecosystem discovers information about the device set in the domain in which the platform controller exists. Such information may include the topology of the devices, the computing resources of the devices, physical locations of the devices, network information associated with the devices, configuration details of the devices, operating systems executing on the devices, the existence of any number of virtualized computing device instances, the storage location of any number of datasets, how much of the capacity of any one or more devices is being used and/or has available, etc.

In one or more embodiments, any mechanism or scheme for discovering such information may be used, and any number of different mechanisms and/or schemes may be used to obtain various types of information. For example, the platform controller may request virtualization infrastructure information from one or more virtualization controllers, determine domain network topology by participating in and/or receiving information shared among domain network devices pursuant to one or more routing protocols, perform queries to determine quantity and type of processors, amount of memory, quantity of GPUs, amount of storage, number of network ports, etc. for servers, determine what type of information is being collected and/or processed by various sensors, controllers, etc., determine where datasets of a particular type or purpose are stored by communicating with one or more storage controllers, etc. Any other form of discovery may be performed by the platform controllers without departing from the scope of embodiments described herein.

In Step 202, based on the information discovered in Step 200, a given platform controller determines what capabilities, including the performance of data management services, the device set of a domain has. In one or more embodiments, determination of the capabilities of the device set, or any portion thereof, may be performed in any manner capable of producing one or more capabilities that a given device set, connected and configured in a particular way, may perform. For example, the platform controller may execute a machine learning algorithm that has been trained to identify certain capabilities of a domain based on the set of information about a given device set of the domain.

In Step 204, the capabilities of the domain determined in Step 202 are communicated from the platform controller to an operatively connected service controller, along with information about the currently available capacity of the domain. For example, a platform controller may communicate to a service controller that the domain has the capability to perform inference, to analyze data in a particular way, to train certain types of machine learning algorithms, has the sensors to obtain certain types of data, to perform data management services associated with transferring data such as preprocessing data to generate events and metadata, etc. At the same time, the platform controller may also communicate, for example, that currently 27% of the resources of the domain, or any potion therein, are available to perform additional work. In one or more embodiments, the platform controller may also communicate any other information about the domain to the service controller, such as that the domain has (or has sensors to obtain) particular datasets that may be used for particular purpose (e.g., training a certain type of machine learning algorithm).

In Step 206, each of the service controllers of the federated controller of an ecosystem shares the capabilities, capacity, and other information with each other. Sharing information may include sending some or all of the information to the other service controllers, and/or storing the information in a location that is commonly accessible by the service controllers. In one or more embodiments, the service controllers also share information about how the different portions of the ecosystem are operatively connected, including types of network devices, network topologies, network distances, and geographic distances between different portions of the ecosystem. For example, the service controllers may use information gained from devices executing a border gateway protocol (BGP) to obtain topology information for the ecosystem.

In Step 208, the federated controller of the ecosystem builds a graph or database using the information communicated from the platform controllers in Step 204, or otherwise obtained and shared in Step 208. In one or more embodiments, the graph or database is stored as a distributed data construct by the service controllers of the federated controller, and may be distributed in any way that a set of information may be divided, so long as it is collectively accessible by each of the service controller of the federated controller. In one or more embodiments, the graph or database is stored in a form which may be queried to find information therein when determine how to provision portions of a workflow for which execution is requested. Receiving a request to execute a workflow, querying the graph or database, and provisioning the workflow portions to various domains in the various portions of the ecosystem are discussed further in the description of FIG. 2B, below.

Figure 2B:
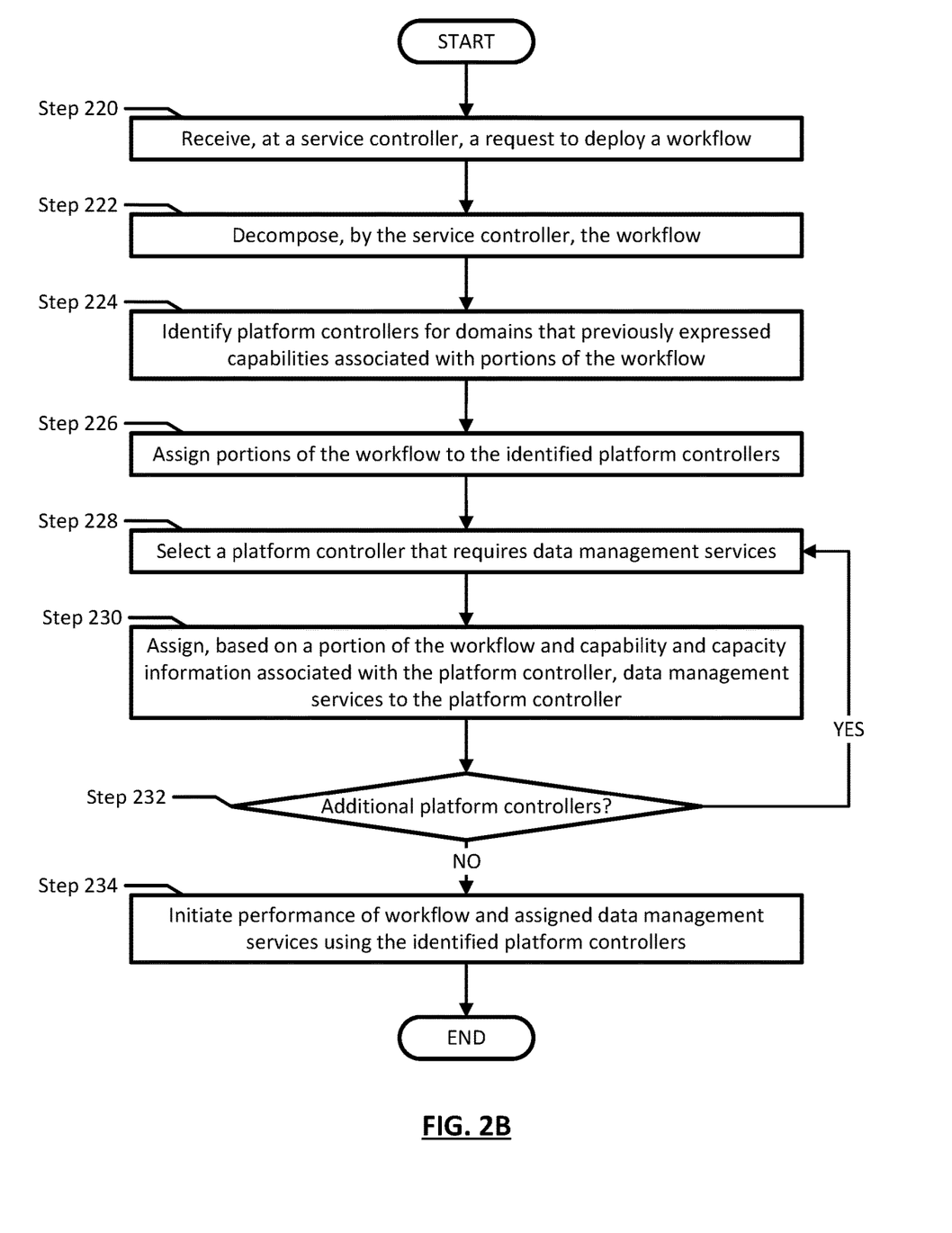
FIG. 2B shows a flowchart in accordance with one or more embodiments of the invention.

FIG. 2B shows a flowchart describing a method for provisioning workflows within a device ecosystem in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request to deploy a workflow is received at a service controller of a federated controller of a device ecosystem. In one or more embodiments, the request is received in any form that conveys, at least, requirements and constraints for performing the workflow. Constraints may be based, at least in part, on an SLO associated with the workflow between the entity requesting execution of the workflow and the entity providing the ecosystem in which the workflow will be deployed. Requirements may include that the workflow will require certain amounts and/or types of compute resources of an ecosystem of devices, require certain amounts and/or types of data be available and/or obtained, require that certain technologies for data transfer be used (e.g., low latency network solutions), etc. In one or more embodiments, the request is received in a form that can be understood as or converted to a DAG. For example, the request may be received in the form of a YAML file that is a manifest of the interconnected services of a workflow. The request may be received at a service controller through any form of communicating with a computing device. For example, a user may be provided with access to a cloud console that is configured to access one or more service controllers of a CECC ecosystem.

In Step 222, the service controller decomposes the workflow. In one or more embodiments, decomposing the workflow includes identifying various workflow portions, such as services to be executed, data to be used and/or obtained, etc. In one or more embodiments, decomposing a workflow includes expressing the workflow as a DAG. A given workflow may include any number of workflow portions. As an example, a workflow may be a single service. As another example, a workflow may be any number of services that are in an ordered relationship with any number of interrelated dependencies between them. In one or more embodiments, decomposing a workflow includes identifying one or more anchor points of the workflow. In one or more embodiments, an anchor point is any workflow portion that can be identified as requiring a specific placement within the device ecosystem in which the workflow is to be deployed. As an example, an anchor point may be a particular dataset (e.g., that is needed for training a machine learning algorithm) that is stored in a certain storage location within the ecosystem. As another example, an anchor point may be a particular capability (e.g., inference, certain data analytics, etc.) that a workflow portion requires that may only be performed by domain device sets having particular characteristics. As another example, an anchor point may be the need for data acquired in a specific geographic region. Workflow portions other than the aforementioned examples may be identified as an anchor point without departing from the scope of embodiments described herein.

In Step 224, the service controller identifies platform controllers for domains that previously expressed capabilities associated with portions of the workflow.

In one or more embodiments, the service controller identifies platform controllers and corresponding domains associated with portions of the workflow by performing a query to the set of information generated from the service controller's one or more underlying platform controllers and/or from the other service controllers of the federated controller, as is discussed above in the description of FIG. 2A. As an example, the capabilities, capacity, and operative connectivity of the various domains in the ecosystem may be organized as a graph, and the service controller may perform a breadth first or depth first search using the graph information structure. As another example, the capabilities, capacity, and operative connectivity of the various domains in the ecosystem may be organized as a database, and the service controller may perform a database query to find the information. The service controller may identify any number of platform controllers of any number of domains that have previously expressed capabilities associated with any number of portions of the workflow without departing from the scope of embodiments described herein.

As discussed above, the service controller may identify any platform controller that includes capability and capacity information that indicates that the domain corresponding to the platform controller is able to perform one or more portions of the workflow. The service controller may identify any number of platform controllers that may be able to perform any number of the portions of the workflow without departing from the scope of embodiments described herein.

In Step 226, the service controller assigns portions of the identified platform controllers. In one or more embodiments, the service controller assigns each portion of the workflow to a platform controller identified in Step 224 that previously expressed the capability to perform the portion of the workflow. The service controller may assign one portion, more than one portion, or all the portions of the workflow to a platform controller that is associated with a domain that is able to perform the one portion, the more than one portion, or all the portions of the workflow. In one or more embodiments, the service controller may attempt to minimize the burden of data transfer within the ecosystem by assigning the workflow portions to optimal domains relative to the placement of the anchor point workflow portion. For example, if the ecosystem includes a far edge portion where image data is being acquired at a certain physical location, a workflow portion for analyzing that data, at least in part, may be assigned to a platform controller of a near edge portion of the ecosystem that is in relatively close physical proximity to the far edge portion, which may minimize the transmission times for the image data being obtained.

In Step 228, the service controller selects a platform controller that requires data management services. In one or more embodiments, the service controller identifies a platform controller that requires data management services based on the portion of the workflow assigned to the platform controller, other portions of the workflow in which data generated and/or otherwise obtained in the portion of the workflow assigned to the platform controller may be transmitted, and/or capability and capacity information associated with the platform controller. The service controller may select the identified platform controller that requires data management services.

As an example, a platform controller associated with a car (i.e., client) may be assigned a workflow involving capturing video data from cameras included in the car. A portion of the workflow assigned to a platform controller of a near edge connected to the portion of the workflow assigned to the platform controller may include obtaining the video data from the domain associated with the car and using events included data to generate predictions associated with the events by applying a machine learning algorithm to the video data. The domain associated with the platform controller may be connected to the near edge in two different ways, a mobile cellular connection when the client is not docked at the near edge, and a high speed fiber connection when docked at the near edge. The service controller may identify that data management services are required for the platform controller on the car to facilitate and/or optimize the transmission of video data between the car and the near edge when the car is docked and when the car is not docked. The service controller may select the platform controller associated with the identified data management requirements.

In Step 230, the service controller assigns, based on a portion of the workflow and capability and capacity information associated with the platform controller, data management services to the platform controller. In one or more embodiments, the service controller assigns the required data management services identified in Step 228 to the platform controller. As discussed above, data management services may be assigned to the platform controller based on the portion of the workflow assigned to the platform controller, capability and capacity information associated with the platform controller, and other portions of the workflow connected to the platform controller. The service controller may assign data management services that are required by the portion of the workflow assigned to the platform controller and other portions of the workflow that are connected to the platform controller, and that the platform controller previously expressed that the domain associated with the platform controller is able to perform. The assigned data management services may include any type of data management services associated with the optimization of the transmission of data between domains without departing from the departing from the scope of embodiments described herein.

Continuing with the example discussed above in Step 228, the service controller may assign data management services that include preprocessing video data to generate events and metadata associated with the video data. The assigned data management services may also include two types of data transmission that utilize the two types of network connections with the near edge. The first type of data transmission may include streaming the events and metadata generated during preprocessing to the near edge over the mobile cellular connection. The second type of data transmission may be bulk offload of data over the high speed fiber connection when docked at the near edge based on requests for video data associated with particular events from the near edge based on the obtained events and metadata.

In Step 232, a determination is made as to whether there are additional platform controllers that require data management services. In one or more embodiments, the service controller determines whether there are additional platform controllers of the identified platform controllers of Step 224 by identifying an additional platform controller not already assigned with data managements services that requires data managements services. In one or more embodiments, the service controller identifies a platform controller that requires data management services based on the portion of the workflow assigned to the platform controller, other portions of the workflow in which data generated and/or otherwise obtained in the portion of the workflow assigned to the platform controller may be transmitted, and/or capability and capacity information associated with the platform controller. The platform controllers identified in Step 224 may include any number of platform controllers that require data management services without departing from the departing from the scope of embodiments described herein.

In one or more embodiments of the invention, if the service controller determines that there are additional platform controllers that require data management services, then the method proceeds to Step 228. In one or more embodiments of the invention, if the service controller determines that there are no additional platform controllers that require data management services, then the method proceeds to Step 234.

In step 234, the service controller initiates the performance of the workflow and the assigned data management services using the identified platform controllers. In one or more embodiments, the performance of the workflow is initiated by directly providing the portions of the workflow, data management services (if assigned), and constraints to the identified platform controllers that are in the same ecosystem portion as the service controller. In one or more embodiments, other workflow portions, data management services (if assigned), and corresponding constraints are provided to the one or more identified platform controllers indirectly (e.g., by way of another service controller that is in the ecosystem portion in which the one or more initial platform controllers and the one or more additional platform controllers exist). In one or more embodiments, the workflow, data management services, and any corresponding constraints are provided to the identified platform controllers using any appropriate method of data transmission.

As an example, the service controller may communicate the workflow details, data management services details, and corresponding constraints as network data traffic units over a series of network devices that operatively connect the service controller and the identified platform controllers. In one or more embodiments of the invention, after obtaining the workflow, data management services, and constraints from the service controller, the identified platform controllers may provision and/or configure devices included in the one or more domains corresponding to the identified platform controllers to perform the workflow and data management services in a way that satisfies the constraints. In one or more embodiments, once all or any portion of the device set of the one or more domains has been configured to perform the workflow and the data management services, the workflow and data management services are executed.

Figure 3:
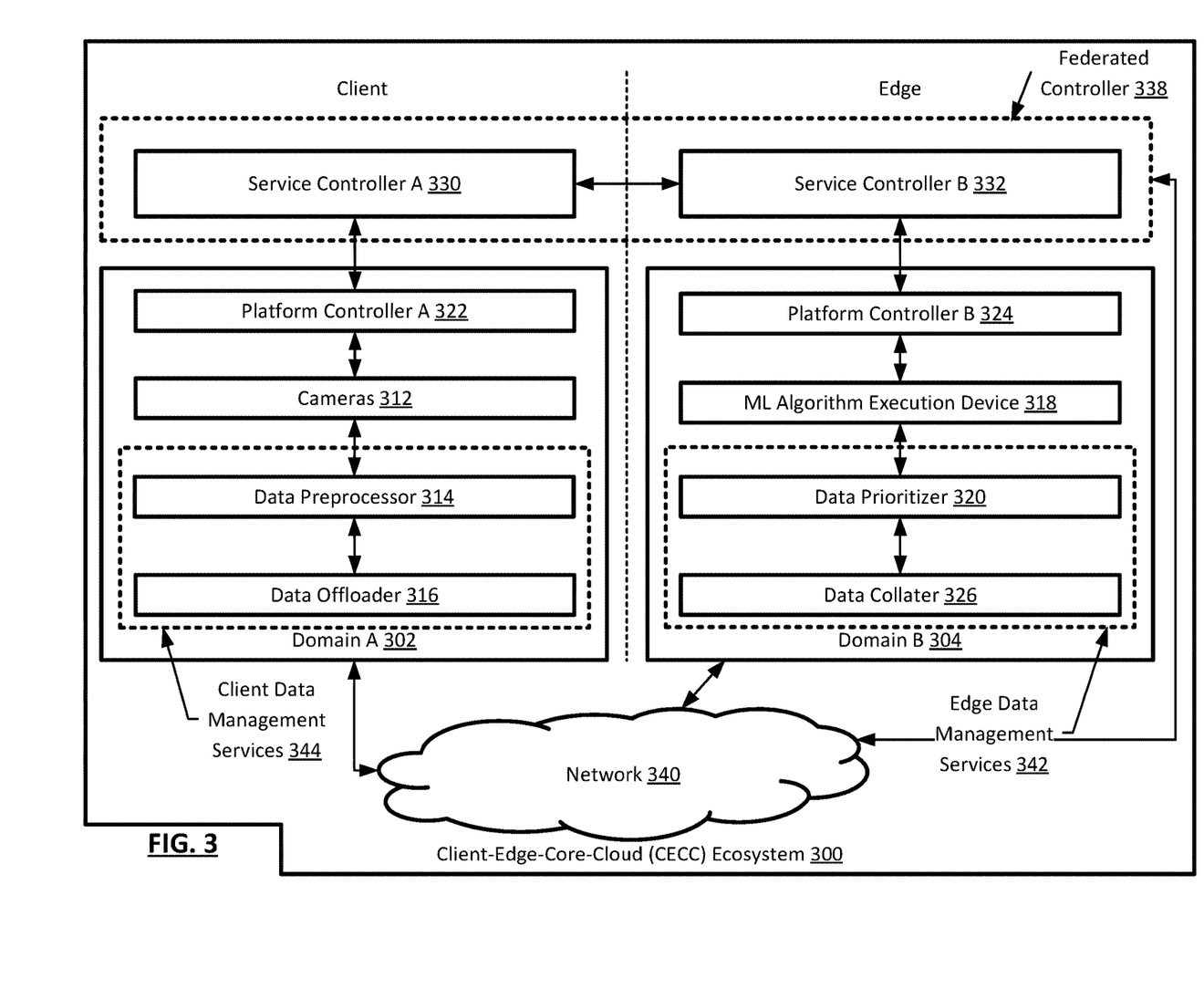
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein may use a device ecosystem organized and interconnected in any manner, and that any number of different workflows to achieve any number of different results may be deployed in such an ecosystem of devices.

Referring to FIG. 3, consider a scenario in which there are cameras deployed on a mobile self-driving cars to monitor events encountered by the car during a trip. Based on the events, a car manufacturer wants to use the video data to determine whether the car responds correctly to the events (e.g., changing lanes, passing other cars, etc.). To achieve this goal, the car manufacture needs a machine learning algorithm that has been trained to recognize when video data of events indicate that the car has incorrectly responded to events, and the ability to execute the trained algorithm using the video obtained by the cameras on the car.

In such a scenario, the store will utilize CECC ecosystem (300), which includes domain A (302) in a client portion of the ecosystem and domain B (304) in an edge portion of the ecosystem. Domain A (302) includes platform controller A (322), cameras (312) data preprocessor (314), and a data offloader (316). Domain B (304) includes platform controller B (324), data prioritizer (320), data collater (326), and machine learning (ML) algorithm execution device (318). Domain A (302) is operatively connected to service controller A (330). Domain B (304) is operatively connected to service controller B (332). Service controller A (330) and service controller B (332) collectively are federated controller (338). All or any portion of any device or set of devices in CECC ecosystem (300) may be operatively connected to any other device or set of devices via network (340).

The client portion of the ecosystem exists in the car as cameras (312) on the car, and the associated computing devices for capturing the video data, preprocessing video data (i.e., data preprocessor (314)), and offloading video data (i.e., data offloader (316)). The edge portion of the ecosystem exists as a garage, and includes computing devices for collating the data (i.e., data collater (326)), prioritizing data (i.e., data prioritizer (320)), and computing devices for executing the trained ML algorithm (i.e., ML algorithm execution device (318)).

When the car manufacturer seeks to implement the new inventory management scheme, it submits the workflow as a YAML file to service controller B (332), which is implemented on a server located at the garage and accessed via a console from a computer of the car manufacturer. Service controller B (332) converts the YAML file into a DAG. In the DAG, the video data must be obtained from the cameras (312) on the car, and the video data must be provided to the ML algorithm execution device (318) located in the edge portion of the ecosystem in the garage. The video data from the cameras (312) must be collated and provided to ML algorithm execution device (318). Finally, the results of executing the ML algorithm based on the video data must be stored in storage of the garage (not shown).

Service controller B (332) decomposes the DAG, and identifies the image acquisition from the cameras in the store as the anchor point. Service controller A then performs a search of a previously constructed graph of capabilities and capacity of the various domains in the ecosystem, and identifies domain A (302) as including the relevant cameras (312). Domain A (302) and the cameras (312) therein thus become the anchor point for the workflow. Service controller B (332) continues the search based on the anchor point, by searching within portions of the ecosystem in the same region of the country as the location of the store, and identifies that domain B (304), which is located at the garage where the car docks, has expressed through platform controller B (324) and service controller B (332) that it has the capability to perform data collation services, and that it also has the capability to execute ML algorithms. Accordingly, service controller A assigns the data collation and ML algorithm execution portions of the workflow to platform controller B (324).

Service controller B (332) then identifies both platform controller A (322) and platform controller B (324) as platform controllers that require data management services. The service controller identifies that domain A (302) is connected to domain B (304) via a mobile cellular network when the car is not docked in the garage and connected via a high speed fiber connection when the car is docked in the garage. Based on the workflow portion assigned to platform controller A (322) and the workflow portion assigned to platform B (324), the service controller determines that both platform controller A (322) and platform controller B (324) require data management services to facilitate the transmission of large quantities of video data from domain A (302) to domain B (304). Service controller B (332) determines, based on previously expressed capability and capacity information associated with platform controller A (322) and platform controller B (324), that the domain corresponding to platform controller A is able to perform client data management services (344) and the domain corresponding to platform controller B (324) is able to perform edge data management services (342). Accordingly, service controller B (332) assigns client data management services (344) to platform controller A (322) of domain A (302) and edge data management services to platform controller B (324) of domain B (304).

The client data management services (344) include data preprocessing (e.g., performed by the data preprocessor (314)). The data preprocessing includes identifying events included in the video data and generating metadata associated with the events. The metadata includes type of event, one or more timestamps associated the event, and portions of the video data associated with the events. The client data management services (344) further include offloading (e.g., performed by the data offloader (316)) of video data and events and metadata to domain B (304). The offloading may include transmitting events and metadata to domain B (304) using the mobile cellular network connection when the car is not docked and performing bulk transfers of video data to domain B (304) based on prioritized requests from domain B (304) using the high speed fiber connection when the car is docked in the garage.

The edge data management services (342) include data collation (e.g., performed by the data collater (326)). Data collation includes obtaining events and metadata from domain A (302) and providing the events and metadata to a data prioritizer (320). Additionally, the data collation services further include obtaining prioritized requests from the data prioritizer (320) to obtain video data associated with particular events first during the bulk offload of data from domain A (302) to domain B (304) and to provide the video data to the ML algorithm execution device (318). The edge data management services (342) further includes data prioritization (e.g., performed by the data prioritizer (320)).

Data prioritization includes maintaining a prioritized queue of events associated with video data to offload during bulk transfer of data from domain A (302) to domain B (304), with video data associated with events first in queue requested to be offloaded before video data associated with events later in queue. The prioritized queue may be generated based on events and metadata obtained from the data collater (326).

Based on the above results gained from searching within the graph structure maintained by the service controllers of federated controller (338) and assigning data management services to facilitate the transfer of data between domain A (302) and domain B (304), service controller B (332) provides the various workflow portions and the data management services to the appropriate platform controllers to perform the workflow portions and the data management services.

Once assigned, platform controller A (322) deploys the data acquisition portion of the workflow on the cameras (312) of the car while the car is not docked. Additionally, platform controller A (322) deploys the data preprocessing and the data offloading services on the data preprocessor (314) and the data offloader (316) respectively. Platform controller B (332) provisions data collater (314) to perform the data collation and the data prioritizer (320) to perform data prioritization. Platform controller B also provisions a set of devices to perform execution of the ML algorithm, as ML algorithm execution device (318). Furthermore, platform controller B (324) provisions storage of domain B (304) to store the results of the ML algorithm execution device (318).

As the various workflow portions and data management services get deployed in the appropriate locations in the ecosystem, execution begins. First, cameras (312) in domain A (302) begin capturing video of events while the car is not docked (i.e., in transit). The data preprocessor (314) generates events and metadata associated with the video data and provides the events and metadata to the data offloader (316), which transmits the events and metadata to the data collater (326) of domain B (304) using the mobile cellular network connection. Upon receiving the events and metadata, the data collater (326) provides the events and metadata to the data prioritizer (320), which generates a prioritized queue associated with the events using the events and metadata. Then, the car docks in the garage. As a result, the data collater (326) begins requesting video data based on the prioritized queue. The data offloader (316) transmits the video data based on the prioritized queue request using the high speed fiber connection. The data collater obtains the prioritized video data and provides the prioritized video data to the ML algorithm execution device (318). ML algorithm execution device (318) then executes the ML algorithm using the prioritized video data to determine whether the car responded to the events correctly. The results are then stored in storage of domain B (304), where a car manufacturer may further process the results to determine actions to perform when the car does not respond to events correctly.

In the above example, the graph construct representing the capabilities and capacity of the various domains was used to quickly and automatically determine where to place workflow portions based on the requirements, constraints, and capabilities learned by decomposing the DAG of the workflow. Once the workflow portions were assigned to the platform controllers, the service controller assigns data management services to platform controllers that require the aforementioned data management services based on the assigned workflow portions, requirements, constraints, and the capabilities associated with each platform controller. Thus a workflow is provisioned in domains that include data management services to facilitate the transmission of data between domains. As a result, the efficiency of the execution of workflows in complex device ecosystems is improved and the chance that workflow portion execution would fail, or fail to meet the SLO associated with the workflow is reduced.

Figure 4:
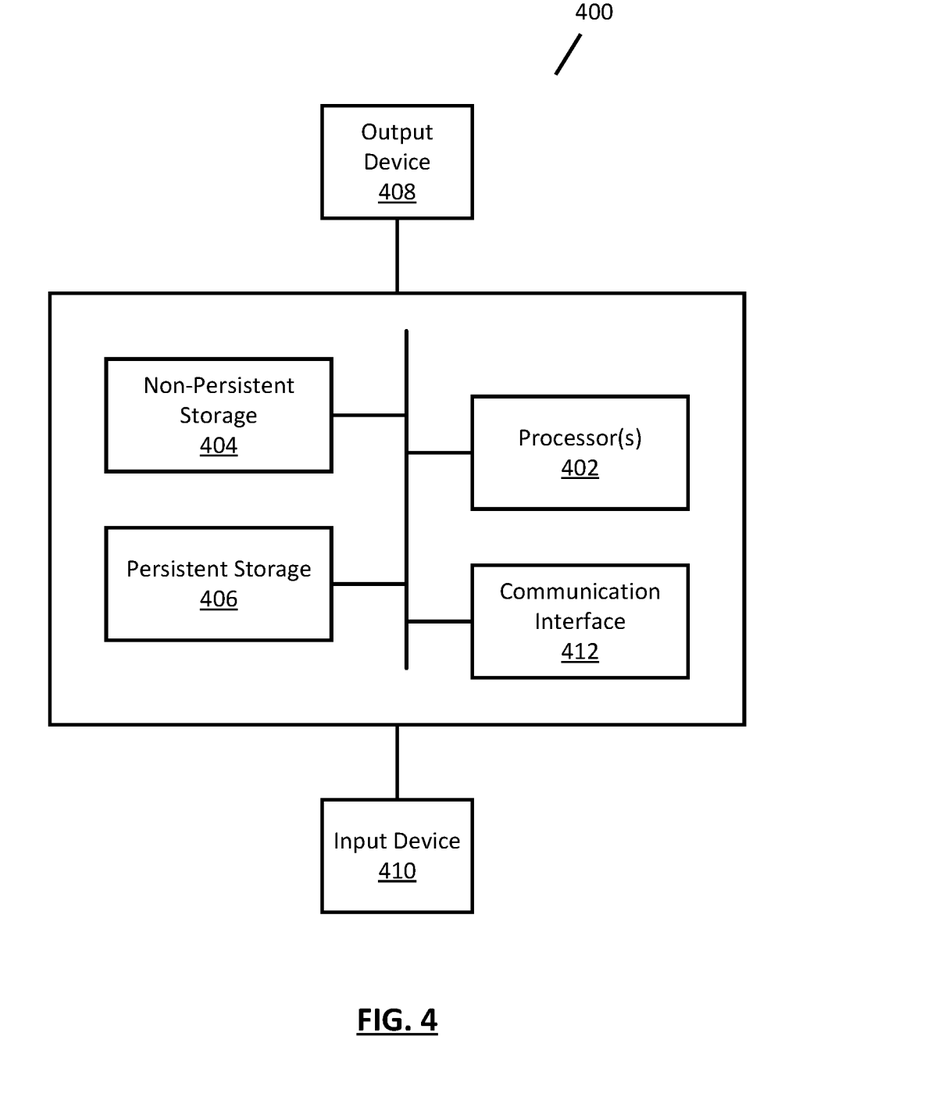
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein use several layers of a graph or database as a mechanism to manage the ecosystem at scale using algorithms and techniques for searching and querying. In one or more embodiments, building relationships and maintaining the state of the resources and data for supporting service delivery allows for capturing, maintaining, and analyzing the mapping in the graph and/or relationships in the database to determine data management services to assign with domains executing portions of the workflow to facilitate the transmission of data between domains. In addition, scheduling the workflow and data management services increases the likelihood of meeting the SLO for the workflow and reducing the computational burden and time requirements for transmitting data between domains during execution of workflows.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for deploying workflows with data management services, the method comprising:
   receiving, at a service controller of a federated controller, a request to deploy a workflow in a device ecosystem;
   decomposing, by the service controller, the workflow into a plurality of workflow portions;
   identifying a first platform controller for a first domain that previously expressed capabilities corresponding to a first workflow portion of the plurality of workflow portions;
   assigning, based on the identifying of the first platform controller, the first workflow portion to the first platform controller;
   identifying a second platform controller for a second domain that previously expressed capabilities corresponding to a second workflow portion of the plurality of workflow portions;
   assigning, based on the identifying of the second platform controller, the second workflow portion to the second platform controller;
   assigning, based on the plurality of workflow portions and a capabilities and constraints data construct, data management services to the first platform controller and the second platform controller; and
   initiating performance of the first workflow portion by the first platform controller and the second workflow portion by the second platform controller, wherein performing the first workflow portion and the second workflow portion comprises performing the data management services.

2. The method of claim 1, wherein the data management services comprise transmitting data from the first domain to the second domain.

3. The method of claim 2, wherein assigning the data management services to the platform controllers comprises:
   identifying, based on the capabilities and constraints data construct, a first portion of the data management services associated with the first workflow portion;
   assigning the first portion of the data management services to the first platform controller;
   identifying, based on the capabilities and constraints data construct, a second portion of the data management services associated with the second workflow portion; and
   assigning the second portion of the data management services to the second platform controller.

4. The method of claim 3, wherein the first portion of the data management services comprises preprocessing the data to send preprocessed data to the second domain, and wherein the second portion of the data management services comprises obtaining the preprocessed data and performing the second portion of the workflow based on the preprocessed data.

5. The method of claim 3, wherein the capabilities and constraints data construct specifies that the first domain is capable of performing the first portion of the data management services.

6. The method of claim 3, wherein the capabilities and constraints data construct specifies that the second domain is capable of performing the second portion of the data management services.

7. The method of claim 1, wherein the capabilities and constraints data construct is one selected from a group consisting of a distributed graph and a database.

8. A non-transitory computer readable medium comprising computer readable program code, which when executed by a computer processor enables the computer processor to perform a method for deploying workflows with data management services, the method comprising:
 receiving, at a service controller of a federated controller, a request to deploy a workflow in a device ecosystem;
 decomposing, by the service controller, the workflow into a plurality of workflow portions;
 identifying a first platform controller for a first domain that previously expressed capabilities corresponding to a first workflow portion of the plurality of workflow portions;
 assigning, based on the identifying of the first platform controller, the first workflow portion to the first platform controller;
 identifying a second platform controller for a second domain that previously expressed capabilities corresponding to a second workflow portion of the plurality of workflow portions;
 assigning, based on the identifying of the second platform controller, the second workflow portion to the second platform controller;
 assigning, based on the plurality of workflow portions and a capabilities and constraints data construct, data management services to the first platform controller and the second platform controller; and
 initiating performance of the first workflow portion by the first platform controller and the second workflow portion by the second platform controller, wherein performing the first workflow portion and the second workflow portion comprises performing the data management services.

9. The non-transitory computer readable medium of claim 8, wherein the data management services comprise transmitting data from the first domain to the second domain.

10. The non-transitory computer readable medium of claim 9, wherein assigning the data management services to the platform controllers comprises:
 identifying, based on the capabilities and constraints data construct, a first portion of the data management services associated with the first workflow portion;
 assigning the first portion of the data management services to the first platform controller;
 identifying, based on the capabilities and constraints data construct, a second portion of the data management services associated with the second workflow portion; and
 assigning the second portion of the data management services to the second platform controller.

11. The non-transitory computer readable medium of claim 10, wherein the first portion of the data management services comprises preprocessing the data to send preprocessed data to the second domain, and wherein the second portion of the data management services comprises obtaining the preprocessed data and performing the second portion of the workflow based on the preprocessed data.

12. The non-transitory computer readable medium of claim 10, wherein the capabilities and constraints data construct specifies that the first domain is capable of performing the first portion of the data management services.

13. The non-transitory computer readable medium of claim 10, wherein the capabilities and constraints data construct specifies that the second domain is capable of performing the second portion of the data management services.

14. The non-transitory computer readable medium of claim 8, wherein the capabilities and constraints data construct is one selected from a group consisting of a distributed graph and a database.

15. A system for deploying workflows with data management services, the system comprising:
 a federated controller for a device ecosystem, the federated controller comprising a plurality of service controllers;
 a service controller of the federated controller, comprising a processor and memory, and configured to:
  receive a request to deploy a workflow in the device ecosystem;
  decompose the workflow into a plurality of workflow portions;
  identify a first platform controller for a first domain that previously expressed capabilities corresponding to a first workflow portion of the plurality of workflow portions;
  assign, based on the identifying of the first platform controller, the first workflow portion to the first platform controller;
  identify a second platform controller for a second domain that previously expressed capabilities corresponding to a second workflow portion of the plurality of workflow portions;
  assign, based on the identifying of the second platform controller, the second workflow portion to the second platform controller;
  assign, based on the plurality of workflow portions and a capabilities and constraints data construct, data management services to the first platform controller and the second platform controller; and
  initiate performance of the first workflow portion by the first platform controller and the second workflow portion by the second platform controller, wherein performing the first workflow portion and the second workflow portion comprises performing the data management services.

16. The system of claim 15, wherein the data management services comprise transmitting data from the first domain to the second domain.

17. The system of claim 16, wherein assigning the data management services to the platform controllers comprises:
 identifying, based on the capabilities and constraints data construct, a first portion of the data management services associated with the first workflow portion;
 assigning the first portion of the data management services to the first platform controller;
 identifying, based on the capabilities and constraints data construct, a second portion of the data management services associated with the second workflow portion; and
 assigning the second portion of the data management services to the second platform controller.

18. The system of claim 17, wherein the first portion of the data management services comprises preprocessing the data to send preprocessed data to the second domain, and wherein the second portion of the data management services comprises obtaining the preprocessed data and performing the second portion of the workflow based on the preprocessed data.

19. The system of claim 17, wherein the capabilities and constraints data construct specifies that the first domain is capable of performing the first portion of the data management services.

20. The system of claim 17, wherein the capabilities and constraints data construct specifies that the second domain is capable of performing the second portion of the data management services.

* * * * *